United States Patent Office 3,365,859
Patented Jan. 30, 1968

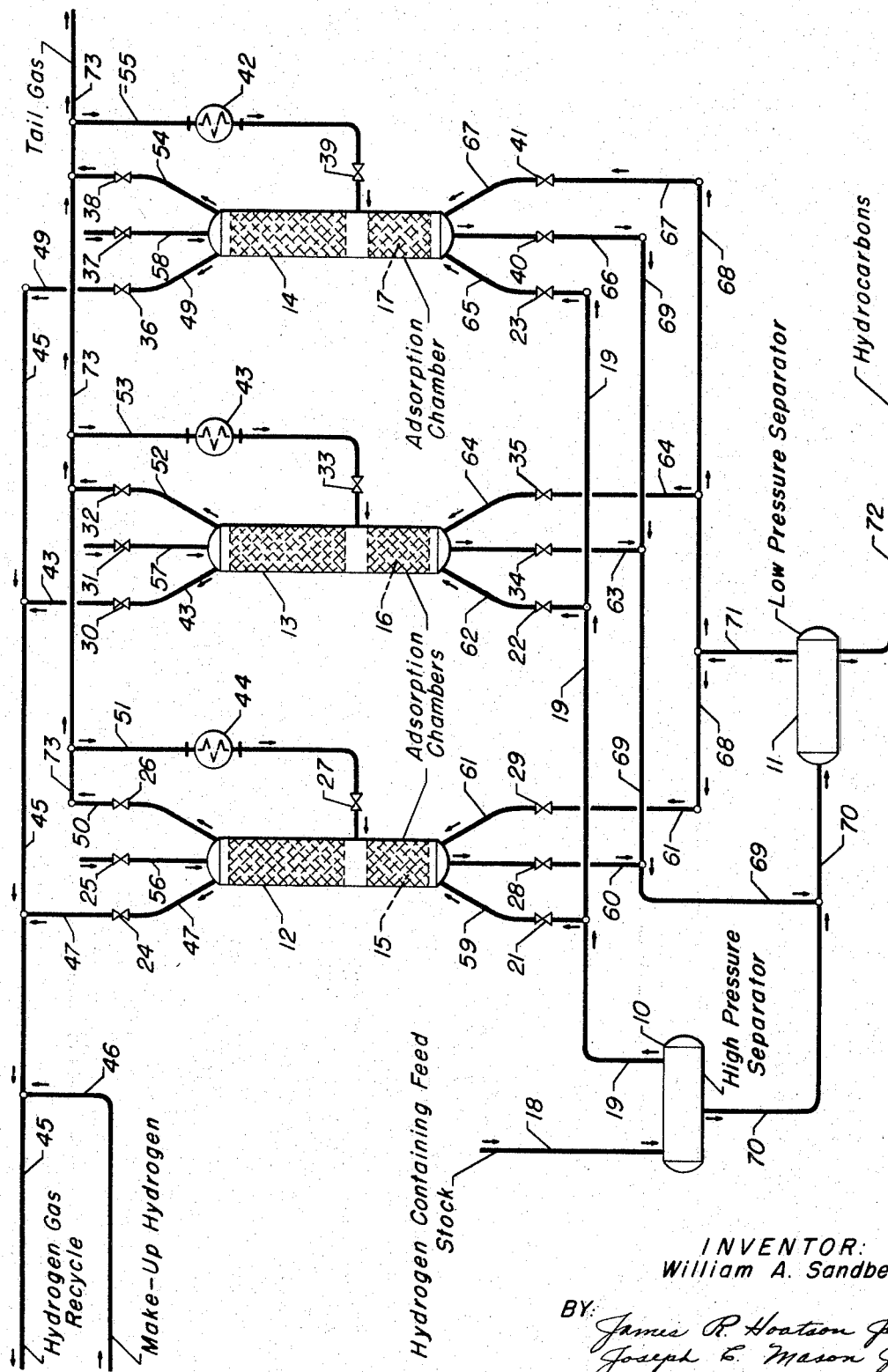
INVENTOR:
William A. Sandberg

3,365,859
METHOD FOR CONCENTRATING HYDROGEN
William A. Sandberg, Orinda, Calif., assignor to Universal Oil Products Company, Des Plaines, Ill., a corporation of Delaware
Filed Nov. 4, 1966, Ser. No. 592,190
7 Claims. (Cl. 55—25)

ABSTRACT OF THE DISCLOSURE

Method for recovering a concentrated hydrogen stream from a gaseous charge mixture containing aromatic and normally gaseous paraffinic hydrocarbons utilizing a plurality of purifying zones operating in cyclic fashion and using a hydrocarbon adsorption medium to adsorb a major proportion of said hydrocarbons in a manner which concentrates the paraffinic hydrocarbons in one portion of the adsorbing medium and the aromatic hydrocarbons in another portion of the adsorbing medium. The adsorption zones are thereafter alternately regenerated by passing therethrough a desorbing gas at least part of which was a component in the original charge mixture. The pressure of the desorbing gas during regeneration is at a relatively low pressure.

---

This invention relates to the separation of gases. It particularly relates to a method for recovering a concentrated stream of hydrogen from a gaseous mixture. It especially relates to a method for separating hydrogen from light hydrocarbons, such as methane, and certain aromatic hydrocarbons, such as benzene, via a unified adsorption process.

In conventional petroleum refining practice various processes commonly employed in refining and/or converting petroleum based feed stocks, yield byproduct gases containing hydrogen in admixture with methane and other light hydrocarbons such as ethane and propane, etc. Examples of such processes are thermal cracking, catalytic cracking, catalytic reforming, catalytic and thermal hydrogenation, and various combinations of these processes, and the like. In many cases, the concentration of hydrogen in the gaseous effluents from these processes is usually too low to permit its use directly in other processes, such as synthesis of ammonia, hydrogenation of edible fats, etc., or to permit its use as a recycle gas in the process from which it was originally derived. Therefore, it is desirable to separate and recover the hydrogen in concentrated form from such other gases for use in refinery operations.

The prior art procedures for separating components from hydrogen-containing gases usually involve the use of an adsorption step in which, for example, heavier components are selectively adsorbed from the lighter components by an adsorber oil, such as light kerosene. The rich adsorber oil is then stripped and reactivated for separating the adsorbed components from each other. In many cases, the prior art processes are operated with a plurality of adsorption zones containing solid adsorbent material such that while one zone is in an adsorbing operation, another zone is in a first desorbing operation, and still another zone is in a second desorbing operation, etc. Also, in actual practice the prior art processes were usually limited to a two-component separation, such as separating straight chain hydrocarbons from non-straight chain hydrocarbons.

However, it is to be noted that if the hydrogen-containing gas stream was derived from a process such as the hydrodealkylation of alkyl aromatic hydrocarbon, the effluent gaseous stream contains not only hydrogen and normally gaseous paraffinic hydrocarbons, but it also contains significant quanitities of aromatic hydrocarbons. Heretofore, the prior art processes have not taught an unified adsorption process for removing both the paraffins and the aromatics from a hydrogen-containing gas.

Accordingly, it is an object of this invention to provide a process for separating gases.

It is another object of this invention to produce a concentrated hydrogen gas stream from gaseous fractions containing hydrogen and other relatively low molecular weight hydrocarbons.

A further object of this invention is to produce high purity hydrogen from gaseous fractions containing hydrogen, normally gaseous paraffins, and aromatic hydrocarbons in a more facile and economic manner than has heretofore been possible.

A broad embodiment of the present invention relates to a method for concentrating hydrogen which comprises contacting at relatively high pressure a gaseous charge mixture containing hydrogen and hydrocarbons, including aromatic and normally gaseous paraffinic hydrocarbons, in a cyclic operation utilizing a plurality of purifying zones, with a hydrocarbon adsorption medium to adsorb a major proportion of said hydrocarbons under conditions sufficient to concentrate the paraffinic hydrocarbons in one portion of said medium and the aromatic hydrocarbons in another portion of said medium. The adsorption medium in these zones is alternately regenerated by passing therethrough a hereinafter specified gas in unheated condition to remove the paraffinic hydrocarbons therefrom, and by passing therethrough subsequently a hereinafter specified gas in heated condition to remove the aromatic hydrocarbons therefrom. In all cases, the pressure of the desorbing gas in said zones during regeneration is at a relatively low pressure. Then, in an alternating manner, a major proportion of the paraffinic hydrocarbon-containing gas is passed through heating means to produce said hereinabove specified heated gas, which is passed only through that portion of said medium having the aromatic hydrocarbons concentrated therein. The effluent from said zones containing the removed aromatic hydrocarbons is separated from the gas stream by means such as cooling the gas to an unheated condition. In a like alternating manner said unheated gas is passed through said medium to regenerate the medium as hereinabove specified by removing therefrom the paraffinic hydrocarbons. Finally, product streams are removed from the process comprising aromatic hydrocarbons, tail gas comprising said paraffinic hydrocarbon-containing gas, and the desired concentrated hydrogen-containing gas in relatively high purity.

From the foregoing description, it is seen that the adsorption of the hydrocarbons from the hydrogen gas is performed at relatively high pressure, while the desorbing of the hydrocarbons from the adsorption medium is performed at relatively low pressure. Also, it is noted that the desorption of the paraffinic hydrocarbons is performed at substantially the same temperature as the adsorption step, i.e. the desorbing gas is unheated, while the desorption of the aromatic hydrocarbons is performed at an elevated temperature such that the said desorbing gas can be said to be in a heated condition.

In a more specific embodiment of the present invention, the effluent from a catalytic reactor, such as an alkyl aromatic hydrodealkylation reactor, is fed into a high pressure separator in order to separate the effluent into its gaseous and liquid components at a relatively high pressure. The gaseous component is fed alternately to purifying zones for a relatively short period of time. While this stream at relatively high pressure is being introduced into one purifying zone, one or more of the other zones is in a regeneration phase of the cycle. Since the adsorption medium selects between the hydrocarbons present in accordance, generally, with the molecular weight of the hydrocarbon components therein, the heavier paraffinic hydrocarbons and the aromatic hydrocarbons will concentrate in a portion of the zone usually at a locus nearest to the feed gas inlet. It then follows that the relatively light paraffinic hydrocarbons will tend to concentrate in another portion of the zone usually at a locus furtherest from the locus of said feed gas.

The regeneration of the adsorption medium is carried out by, first, passing an unheated gas at relatively low pressure through it to remove the light paraffinic hydrocarbons therefrom. Since the adsorbing medium has a greater affinity for the heavier paraffinic hydrocarbons and the aromatic hydrocarbons, these latter components are not desorbed by the unheated gas to any significant extent even though such gas is at a relatively low pressure. The regeneration continues by passing at least a portion of the effluent gas containing the paraffinic hydrocarbons through heating means such that said portion is now in a heated condition. This heated gas is alternately passed to still another of said zones, but for ease of operation, it is only passed through that portion of the purifying zone which has adsorbed therein the high concentration of the aromatic hydrocarbons. The desorbing of the aromatic hydrocarbons by the heated paraffinic hydrocarbon-containing gas is also performed at relatively low pressure. Following the processing steps of desorbing the paraffinic hydrocarbons and the aromatic hydrocarbons, the effluent gas is respectively passed into a relatively low pressure separator for separating a significant amount of removed hydrocarbons from the gaseous stream. The denuded gaseous stream comprising essentially light hydrocarbons plus some hydrogen is then recycled to the purifying zones in an alternating manner as hereinabove specified.

The effectiveness of the above described procedure depends upon the relative change which occurs in the carrying capacity for the hydrocarbon components between the adsorbing medium and the hydrogen-containing gas stream. For example, the hydrogen-containing gas stream, when it is in equilibrium with the adsorbing medium, can contain a relatively high concentration of the light paraffinic hydrocarbons when the gas pressure is low and the gas stream is in an unheated condition, but only a relatively low concentration of paraffinic hydrocarbons when the pressure is relatively high.

Conversely, the adsorbing medium can contain only a relatively small amount of the light paraffinic hydrocarbons when gas at low pressure and in unheated condition is passed through it, but will retain a relatively large amount of such paraffinic hydrocarbons when the pressure is high. In a similar analogy, with a heavier paraffinic hydrocarbon and aromatic hydrocarbons, the resulting equilibrium situation is identical only when the gas is in a heated condition for desorption.

In order to optimize the practice of this invention the difference between these pressures for adsorption and desorption should be at least 25 p.s.i., and preferably in excess of 50 p.s.i. However, the control point for the process is the pressure for regeneration. Therefore, the gas pressure during each regeneration step, including paraffinic hydrocarbon removal and aromatic hydrocarbon removal, should not be lower than that which would cause about a 30° F. decrease in adsorbing medium temperature. The control of these pressures is important to avoid excessive cooling of the absorbing medium due to the rapid evaporation of the hydrocarbon component from the adsorbing medium.

The effectiveness of the resent invention also depends upon utilizing relatively short time periods in each phase of the cyclic operation. The control of the time period is important, inter alia, in order to avoid substantial temperature variation in the purifying zones. The reason for this, of course, is that when adsorption occurs, the temperature in the zone rises due to the release of the heat of adsorption. On the other hand, when the hydrocarbon component is being removed from the adsorbing medium, the temperature tends to decrease due to the evaporation of the hydrocarbon component. As a general rule, the time periods for each phase of the cyclic operation should be in the range of from 2 to 30 minutes, preferably from 6 to 12 minutes. However, since those skilled in the art may use various materials for the adsorbing medium and will process feed stocks having varying compositions under varying process conditions, these time periods may in some cases exceed 30 minutes and may be shorter than 2 minutes. In other words, the basic criteria of time for the practice of this invention is to minimize the size of the system while maintaining practical control of pressures and valving.

The adsorption medium which may be used in the practice of this invention is a solid adsorbent which is usually placed in a fixed bed manner within a retaining vessel. The specific absorbent used can be any known to those skilled in the art which has significant selectivity between paraffinic and aromatic hydrocarbons while having essentially no adsorptivity for hydrogen. Preferably, the absorbent is selected from that class of adsorbents which have relatively high selectivity for aromatics and heavy paraffinic hydrocarbons and relatively low selectivity for normally gaseous light paraffinic hydrocarbons. This differential selectivity of the adsorbent is critical for the proper operation of this invention since otherwise the paraffinic hydrocarbons and aromatic hydrocarbons would not tend to concentrate in different portions of the adsorbing medium. Preferably, the adsorbent is placed in fixed bed relationship such that two or more beds are arranged within a single vessel such that a significant space occurs between the beds. As will be more fully discussed hereinafter, multiple beds may be placed within a single vessel or zone depending upon the various different hydrocarbons which are desired to be separated from the hydrogen-containing gas feed mixture.

Examples of suitable adsorbents include natural or synthetic zeolites, activated charcoal, activated alumina, silica gel, and the like. Preferably, the adsorbent is activated charcoal. As stated hereinabove, the only requirement for the adsorbent is that it have the ability to adsorb both paraffinic and aromatic hydrocarbons and have essentially no selectivity for hydrogen gas. Those skilled in the art will know from the description contained herein how to choose the proper adsorbent for the particular end result desired.

The invention is more specifically illustrated in the accompanying drawing which is a diagrammatic flow sheet illustrating the preferred arrangement of apparatus for conducting the process of the present invention.

The system illustrated in the drawing includes a plurality of purifying chambers 12, 13, and 14 containing activated charcoal as the adsorbent, high pressure separator 10, low pressure separator 11, and heaters 42, 43 and 44 in conjunction therewith. The system also includes valve means 21, 22 and 23 for alternately feeding the charge material into the chambers, valve means 24, 30 and 36 for alternately removing purified gas from the chambers, valve means 26, 32 and 38 for alternately feeding contaminant-containing gas withdrawn from the chambers through the heaters 42, 43 and 44, valve means 27, 33 and 39 for feeding the heated gas into the chambers at a locus intermediate to the ends thereof, valve means 28, 34 and 40 for alternately removing heated contaminant-containing gas from the chambers, and valve means 29, 35 and 41 for alternately returning the gas from the low pressure separator 11 to the chambers for repetition of the cycle. Also, as shown in the drawing, this illustrative system includes three (3) adsorption chambers separated into two (2) separate beds such that the heated gas feeding means is at a locus therebetween.

Referring to the drawing, a hydrogen-containing feed stock, such as the effluent from an alkyl aromatic hydrodealkylation process for the production of benzene, is fed through line 18 into high pressure separator 10 at a pressure of from 300 to 1200 p.s.i., preferably approximately 500 p.s.i., and at a temperature from 55° F. to 200° F., preferably approximately 100° F. The gaseous and liquid components under these conditions are separated therein, with the liquid components, comprising primarily benzene and toluene plus small amounts of diphenyl, being removed from separator 10 via line 70 and passed into low pressure separator 11 and subsequently out of the processing scheme via line 72.

The gaseous stream containing, by volume, hydrogen 60%, methane 34%, ethane 3%, benzene 2%, and toluene 1%, is removed via line 19, alternately, to chambers 12, 13, and 14 through valves 21, 22, and 23, lines 59, 62, and 65. The pressure in chambers 12, 13, and 14, alternately, is at relatively high pressure, such as that in separator 10 less the normal pressure drop through the system. At one stage of the operation, this hydrogen-containing gas is fed through valve 21 and line 59 into chamber 12 wherein it is contacted with the activated charcoal adsorbent for a relatively short period of time. The benzen and toluene are concentrated in that portion of the bed designated as 15, with the methane and ethane being concentrated in the upper bed of the zone. The concentrated hydrogen stream having been substantially denuded of its hydrocarbon content is removed through valve 24 and lines 47 and 45 for recycle to the hydrodealkylation process. Makeup hydrogen, as needed, is added to the process via line 46.

The composition of the concentrated hydrogen stream in line 47 is at least 90% hydrogen by volume. Minor amounts of methane and ethane may also be present in this stream, for example, 7% and 3% by volume respectively. Those skilled in the art will understand that the purity of the hydrogen stream leaving the adsorption chamber can be varied considerably depending upon the contact time employed, temperatures and pressures in the zone, and the amount of adsorbent in each bed of the chambers. If desired, the concentration of hydrogen in the effluent from the chamber can exceed 98% by volume, although from 90% to 95% hydrogen represents a typical operation.

After chamber 12 has been used for adsorbing the hydrocarbon components from the hydrogen-containing gas stream for a relatively short period of time, such as 2 to 30 minutes, valves 21 and 24 are closed and the hydrocarbon-rich hydrogen stream in line 19 is diverted to chamber 13 by opening valve 22. Chamber 12 is then prepared for the regenerating stage of its cycle. This is done by opening valves 29 and 26 thus causing lean gas removed from low pressure separator 11 to flow through chamber 12 via lines 71, 68 and 61 in an unheated condition as more fully discussed hereinafter. The gas from low pressure separator 11 has been previously denuded of at least part of its hydrocarbon content and is at a temperature of from 55° F. to 150° F., preferably, say, 100° F., which represents an unheated condition. The regenerating gas, which has desorbed methane and ethane from the upper portion of the adsorbent bed in chamber 12, is removed from chamber 12 through valve 26 and line 50 into collecting line 73 for further handling. The gas pressure during this regeneration stage is regulated and maintained at the pressure of, for example, fuel gas pressure of about 50 p.s.i.g. The careful control of the pressure during this regeneration step, maintained between atmospheric pressure and 1175 p.s.i., preferably between 25 p.s.i. and 200 p.s.i., is done to avoid flash vaporization of the methane and ethane retained in the adsorbent which would cause excessively rapid cooling of the adsorbent. By maintaining the gas pressure near the fuel gas pressure, evaporation of both methane and ethane would occur more slowly and the heat of evaporation can be supplied largely by the gas flowing through chamber 12.

During the regenerating of the activated charcoal in chamber 12 for a suitably short time, such as 2 to 30 minutes, preferably 6 to 12 minutes, a major proportion of the hydrocarbon-enriched gas in line 73 simultaneously is being compressed by means not shown, if necessary, and is being diverted through line 55 into heater 42 from header line 73 wherein it is heated to a suitable temperature, for example, from 300° F. to 500° F., preferably approximately 375° F. The heated gas at a relatively low pressure of, say, from atmospheric to 1175 p.s.i. is then passed from heater 42 through valve 39 into chamber 14 which had been heretofore in the paraffin-described regeneration cycle at a locus between the two beds located therein. Valve 40 is now in an open position and the heated gas flows through only bed 17 thereby desorbing the benzene and toluene retained in the adsorbent. This regenerated gas now contains methane, ethane, benzene and toluene in a heated condition and now leaves chamber 14 via line 66 through valve 40 and lines 69 and 70 into low pressure separator 11.

The conditions in low pressure separator 11 are maintained relatively cool in temperature, for example approximately 100° F., by having associated therewith suitable cooling means (not shown) to control the temperature of the stream flowing into separator 11 from line 70. The pressure in separator 11 is also controlled such that the exit gas leaving the separator through line 71 is at approximately the pressure of the fuel gas system. For efficiency of operation, a suitable inert gas can be supplied to, for example, chamber 14 by opening valve 37 and allowing such gas to flow into the chamber through line 58. It may be desirable to operate in this manner so that the upper bed of adsorbent which has been regenerated will not become contaminated by convection upwardly through the bed by the heated gases flowing into the chamber through valve 39 during the aromatic hydrocarbon removal step.

After the aromatic hydrocarbons have been removed from the adsorbent bed 17, valves 39, 40, 37, 38 and 41 are in a closed position and chamber 14 is now ready to receive fresh feed for the adsorption part of the cycle. Accordingly, the fresh feed alternately is directed from chamber 13 to chamber 14 as more fully discussed hereinbelow.

Therefore, during the aromatic hydrocarbon desorption regeneration cycle in chamber 14, the hydrocarbon-contaminated hydrogen gas stream in line 19 is being purified in chamber 13 in the same manner as described for chamber 12, and the upper portion of the bed in chamber 12 is undergoing light hydrocarbon desorption regeneration. The hydrocarbon-contaminated hydrogen gas passes through valve 22 and line 62 into chamber 13 at a relatively high pressure of, say, 500 p.s.i.g. for a relatively short period of time, e.g. 6 minutes, and the concentrated hydrogen stream flows through valve 30 and line 48 into collecting line 45 for recycle to the process. Thereafter, valves 22 and 30 are closed, valves 35 and 32 are opened, and the light hydrocarbons are desorbed by the unheated gas flowing into chamber 13 via lines 71, 68 and 64. Simultaneously therewith, valves 29 and 26 in chamber 12 are closed and a major proportion of the light hydrocarbon-containing gas in header line 73 is diverted through line 51 into heater 44 from whence it passes in heated condition through valve 27 into chamber 12 for desorbing the aromatic hydrocarbon from the bed 15 as described hereinabove for chamber 14. The desorbing gas in chamber 13 is removed via valve 32 and line 52 into header line 73.

In like manner, following the removal of the methane and ethane from chamber 13, it is placed on the aromatic removal cycle by diverting a major proportion of this unheated gas from header 73 through line 53 into heater 43 from whence it passes through valve 33 into chamber 13 for removal of the aromatic adsorbed in bed 16.

While the aromatic hydrocarbons are being removed at low pressure from chamber 12 using heated gas, chamber 13 is undergoing low pressure regeneration for the removal of light hydrocarbons adsorbed in the upper portion of the bed by passing unheated gas via lines 71, 68 and 64 through valve 35 into chamber 13 and chamber 14 is in its high pressure adsorption cycle as mentioned hereinabove.

The aromatic hydrocarbons which have been desorbed into the heated gas stream in chamber 14 are removed from the chamber via line 66 and valve 40 into collecting line 69 for passage to low pressure separator 11. Valves 36, 38, 23, and 41 are now closed. In like manner, this aromatic-rich, hydrogen-lean gas stream is, alternately, removed from chamber 13 via line 63 through valve 34 and from chamber 12 via line 60 through valve 28 into collecting line 69 and then into low pressure separator 11.

Also, as described for the operation of chamber 14, during the aromatic hydrocarbon desorbing cycle it may be preferable to use an inert gas sweep through the upper portion of the beds contained in chambers 12 and 13 using line 56, valve 25; and line 57, valve 31, respectively.

Throughout this entire operation, product streams are removed from the process as desired. The concentrated hydrogen stream is removed via line 45 for recycle to the process. A minor proportion of the hydrogen-lean gas stream is removed as tail gas from header line 73, and the hydrocarbons, comprising primarily benzene and toluene plus small amounts of the paraffinic hydrocarbons, are removed as a product stream via line 72 from low pressure separator 11.

It can be seen from the above description that the three absorption chambers 12, 13 and 14 are alternately in a different stage of the cyclic operation. For example, when chamber 12 is in its adsorption cycle, chamber 13 is in its light hydrocarbon regeneration cycle with unheated gas, and chamber 14 is in its aromatic desorption cycle using heated gas. In each case, after aromatic hydrocarbon desorption, the chamber in question is placed on its relatively high pressure adsorption cycle.

In the above described system, the valves shown preferably should be motorized valves operated on a cycle timer so that the various operating phases can be properly correlated and effectively controlled. Suitable cycle timing devices are well-known in the art and need not be further described herein. Provision should be made, of course, for supplying the inert gas to the system as described during the illustrative procedure hereinabove.

The present invention, as described herein, is uniquely applicable for preparing a concentrated stream of hydrogen where the refinery in question has makup hydrogen at relatively high purity. That is, the makeup hydrogen added to the process, for example, through line 46 of the attached drawing, has approximately the same composition as the purified hydrogen stream contained in line 45 of the same drawing. However, it will be immediately evident to those skilled in the art that modifications can be made in the system to handle, for example, a situation where the makeup hydrogen is relatively impure. Such modification would require an additional bed in each of the chambers with the makeup hydrogen being passed through the chamber in an alternating manner with the contaminated hydrogen gas from a suitable high pressure separator as described or into another section of the zone as a separate feed stream. Such modification, of course, is intended to be within the scope of this invention and any other modifications are intended to be covered by the method claimed hereinbelow.

The invention claimed:

1. Method for concentrating hydrogen which comprises contacting at relatively high pressure a gaseous charge mixture containing hydrogen and hydrocarbons including aromatic and normally gaseous paraffinic hydrocarbons in a cyclic operation utilizing a plurality of purifying zones with a hydrocarbon adsorption medium to adsorb a major proportion of said hydrocarbons under conditions sufficient to concentrate the paraffinic hydrocarbons in one portion of said medium and the aromatic hydrocarbons in another portion of said medium; alternately regenerating the medium in said zones by passing therethrough hereinafter specified gas in unheated conditions to remove the paraffinic hydrocarbons therefrom and by subsequently passing therethrough hereinafter specified gas in heated condition to remove the aromatic hydrocarbons therefrom, the pressure of the gas in said zones during regeneration being at relatively low pressure; alternately passing a major proportion of the resulting paraffinic hydrocarbon-containing gas through heating means to produce said hereinabove specified heated gas and subsequently passing the heated gas only through that portion of said medium having the aromatic hydrocarbons concentrated therein; separating the removed aromatic hydrocarbons from said heated gas via means including cooling said heated gas to an unheated condition; alternately passing said unheated gas through said medium to regenerate the medium as hereinabove specified; alternately removing as product streams the aromatic hydrocarbons, a minor proportion of said paraffinic hydrocarbon-containing gas, and a concentrated hydrogen-containing gas stream.

2. Method according to claim 1 wherein said aromatic hydrocarbon is primarily benzene and said paraffinic hydrocarbons are selected from the group consisting of methane, ethane, and mixtures of methane and ethane.

3. Method according to claim 2 wherein said medium is activated charcoal.

4. Method according to claim 3 wherein said conditions during adsorption include a pressure from 300 p.s.i. to 1200 p.s.i., a temperature from 55° F. to 200° F., and a contact time from 2 to 30 minutes; said conditions during said aromatic removal step include a temperature from 300° F. to 600° F., a pressure from atmospheric to 1175 p.s.i., and a contact time from 2 to 30 minutes; and said conditions during said paraffinic hydrocarbon removal step include a temperature from 55° F. to 150° F., a pressure from atmospheric to 1175 p.s.i., and a contact time from 2 to 30 minutes.

5. Method according to claim 1 wherein said medium is activated charcoal.

6. A gas purifying system comprising (a) a plurality of chambers containing adsorption medium, (b) means for alternately feeding the charge material at relatively high pressure into said chambers, (c) means for alternately removing purified gas from said chambers, (d) means for alternately feeding contaminant-containing gas withdrawn from said chambers through a heater therefor, (e) means for alternately feeding said heated gas into said chambers at a locus intermediate the ends thereof, (f) means for alternately removing heated contaminant-containing gas from said chambers, (g) means for cooling said heated gas so removed from said chambers, (h) means for separating liquid from the cooled gas, (i) means for alternately returning the gas from said separating means to said chambers at relatively low pressure in unheated condition, (j) means for removing liquid product from said separating means, and (k) means for removing contaminant-containing gas as a product stream.

7. System according to claim 6 wherein said plurality of chambers is three and said adsorption medium is contained in said chambers in two separate beds located such that said heated gas feeding means is therebetween.

References Cited

UNITED STATES PATENTS

| | | | |
|---|---|---|---|
| 2,992,703 | 7/1961 | Vasan et al. | 55—180 |
| 3,141,748 | 7/1964 | Hoke et al. | 55—25 |
| 3,205,166 | 9/1965 | Ludlow et al. | 208—310 |
| 3,221,476 | 12/1965 | Meyer | 55—23 |

REUBEN FRIEDMAN, *Primary Examiner.*

C. N. HART, *Assistant Examiner.*